United States Patent
Shah et al.

(10) Patent No.: US 9,030,990 B1
(45) Date of Patent: May 12, 2015

(54) PAGING A WIRELESS COMMUNICATION DEVICE THAT USES MULTIPLE ACCESS NETWORKS

(75) Inventors: Maulik K. Shah, Overland Park, KS (US); Sachin R. Vargantwar, Overland Park, KS (US); Jasinder Pal Singh, Olathe, KS (US); Siddharth S. Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 585 days.

(21) Appl. No.: 12/953,699

(22) Filed: Nov. 24, 2010

(51) Int. Cl.
| | |
|---|---|
| H04W 4/00 | (2009.01) |
| H04W 4/18 | (2009.01) |
| H04B 7/216 | (2006.01) |
| H04L 12/66 | (2006.01) |
| H04L 12/28 | (2006.01) |
| H04W 68/00 | (2009.01) |
| H04W 40/00 | (2009.01) |

(52) U.S. Cl.
CPC ........................................ H04W 4/18 (2013.01)

(58) Field of Classification Search
CPC .............................. H04W 80/04; H04W 84/12
USPC .......... 370/328, 338, 335, 352, 401; 455/458, 455/433, 446
See application file for complete search history.

(56) References Cited

U.S. PATENT DOCUMENTS

| | | | |
|---|---|---|---|
| 7,460,858 B2 | 12/2008 | Boland et al. | |
| 2004/0120283 A1* | 6/2004 | Rezaiifar et al. | 370/328 |
| 2005/0181767 A1 | 8/2005 | Boland et al. | |
| 2005/0286495 A1* | 12/2005 | Menon et al. | 370/352 |
| 2006/0182069 A1* | 8/2006 | Yu | 370/335 |
| 2008/0261268 A1* | 10/2008 | Nishi et al. | 435/69.1 |
| 2008/0261628 A1* | 10/2008 | Proctor et al. | 455/458 |

* cited by examiner

*Primary Examiner* — Christopher M Brandt
*Assistant Examiner* — Muthuswamy Manoharan

(57) ABSTRACT

A first wireless network serves a wireless device and generates loading information. A second wireless network also serves the wireless device and also generates loading information. The first and second wireless networks share a plurality of wireless access points. A paging system receives a page request for the wireless device for delivery over the first network. The paging system processes the loading information to determine if paging assistance from the second network is applicable. If so, the paging system transfers a first page to the second network for delivery to the wireless device. The paging system receives a page response from the wireless device over the second network and processes the response to identify the shared wireless access point serving the wireless device. The paging system transfers a second page to the first wireless network for delivery to the wireless device through the identified shared wireless access point.

20 Claims, 5 Drawing Sheets

PAGING A WIRELESS COMMUNICATION DEVICE THAT USES MULTIPLE ACCESS NETWORKS

TECHNICAL BACKGROUND

In the field of wireless communications, a page is a short data message sent over a control channel to communicate information to a wireless communication device. Common pages include incoming call alerts, voice mail indicators, text messages, location requests, and data session requests. In the past, a wireless communication network would receive a page request and then broadcast the corresponding page throughout the entire network. As wireless communication networks grew larger and more complex, the concept of paging zones was introduced.

The wireless communication networks were separated into paging zones, where each base station is assigned to a particular paging zone. The base stations broadcast their paging zones to the communication devices they serve, and the communication devices periodically report their current paging zone to the paging system. Thus, instead of broadcasting a page throughout the entire network, the paging system broadcasts the page throughout the applicable paging zone.

Currently, different types of wireless networks are being geographically overlaid. For example, a typical multi-mode smartphone may use both a wireless voice network and a separate wireless data network. Although, they are discretely separate networks, the wireless voice network and the wireless data network often share wireless access points, such as cell towers, shelters, power systems, and the like.

OVERVIEW

A first wireless network serves a wireless device and generates loading information. A second wireless network also serves the wireless device and also generates loading information. The first and second wireless networks share a plurality of wireless access points. A paging system receives a page request for the wireless device for delivery over the first network. The paging system processes the loading information to determine if paging assistance from the second network is applicable. If so, the paging system transfers a first page to the second network for delivery to the wireless device. The paging system receives a page response from the wireless device over the second network and processes the response to identify the shared wireless access point serving the wireless device. The paging system transfers a second page to the first wireless network for delivery to the wireless device through the identified shared wireless access point.

DETAILED DESCRIPTION

Figure 1:
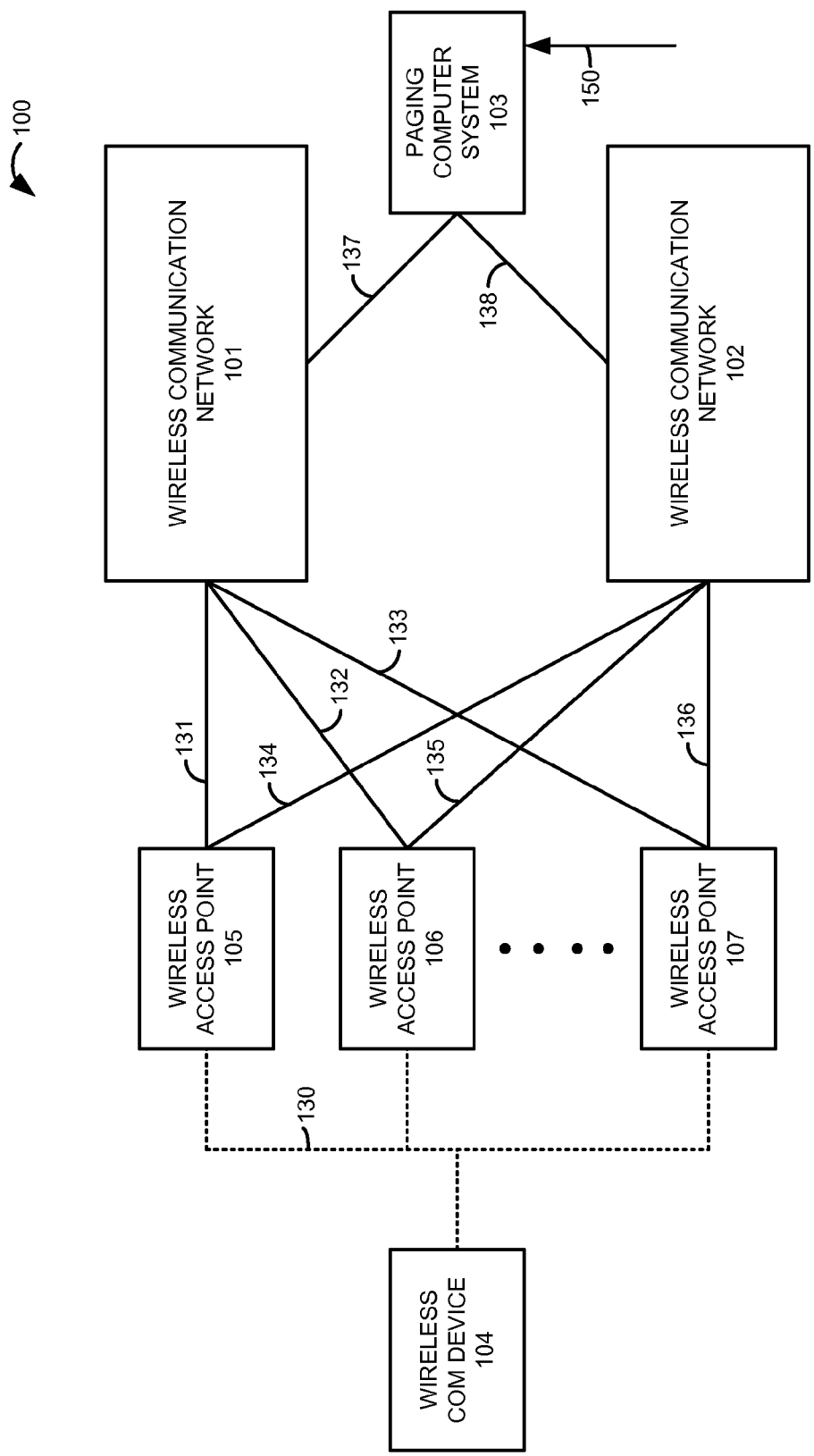
FIG. 1 illustrates a multi-network paging system.

FIG. 1 illustrates multi-network paging system 100. Multi-network paging system 100 comprises wireless communication networks 101-102, paging computer system 103, wireless communication device 104, wireless access points 105-107, and communication links 130-138. Note that wireless communication networks 101-102 share wireless access points 105-107, and although it is not depicted for clarity, both wireless communication networks 101-102 have communications equipment located at wireless access points 105-107.

Wireless communication device 104 and wireless access points 105-107 communicate over wireless communication links 130. Wireless communication network 101 and wireless access points 105-107 communicate over respective communication links 131-133. Wireless communication network 102 and wireless access points 105-107 communicate over respective communication links 134-136. Paging computer system 103 and wireless communication networks 101-102 communicate over respective communication links 137-138.

In operation, paging computer system 103 receives page request 150 for wireless communication device 104 for delivery over wireless communication network 101. At this time, wireless communication device 104 is being served by wireless access point 106. Thus, wireless communication device 104 currently communicates with both wireless networks 101-102 through wireless access point 106.

Based on the loading of wireless communication networks 101-102, paging computer system 103 invokes wireless communication network 102 to assist with the page delivery. Paging computer system 103 transfers a probe page to wireless communication network 102 for delivery to wireless communication device 104, and network 102 transfers the probe page to wireless communication device 104 through wireless access point 106. Wireless communication device 104 transfers a page acknowledgement (ACK) back to wireless communication network 102 through wireless access point 106. Wireless communication network 102 transfers the page ACK to paging computer system 103.

Based on the page ACK, paging computer system 103 determines that wireless communication device 104 is currently being served by wireless access point 106. Paging computer system 103 then transfers a page (based on the initial page request 150) to wireless communication network 101 for delivery to wireless communication device 104 through wireless access point 106. In response, wireless communication network 101 transfers the page to wireless communication device 104 through wireless access point 106. Note that this page is not broadcast through multiple wireless access points.

Figure 2:
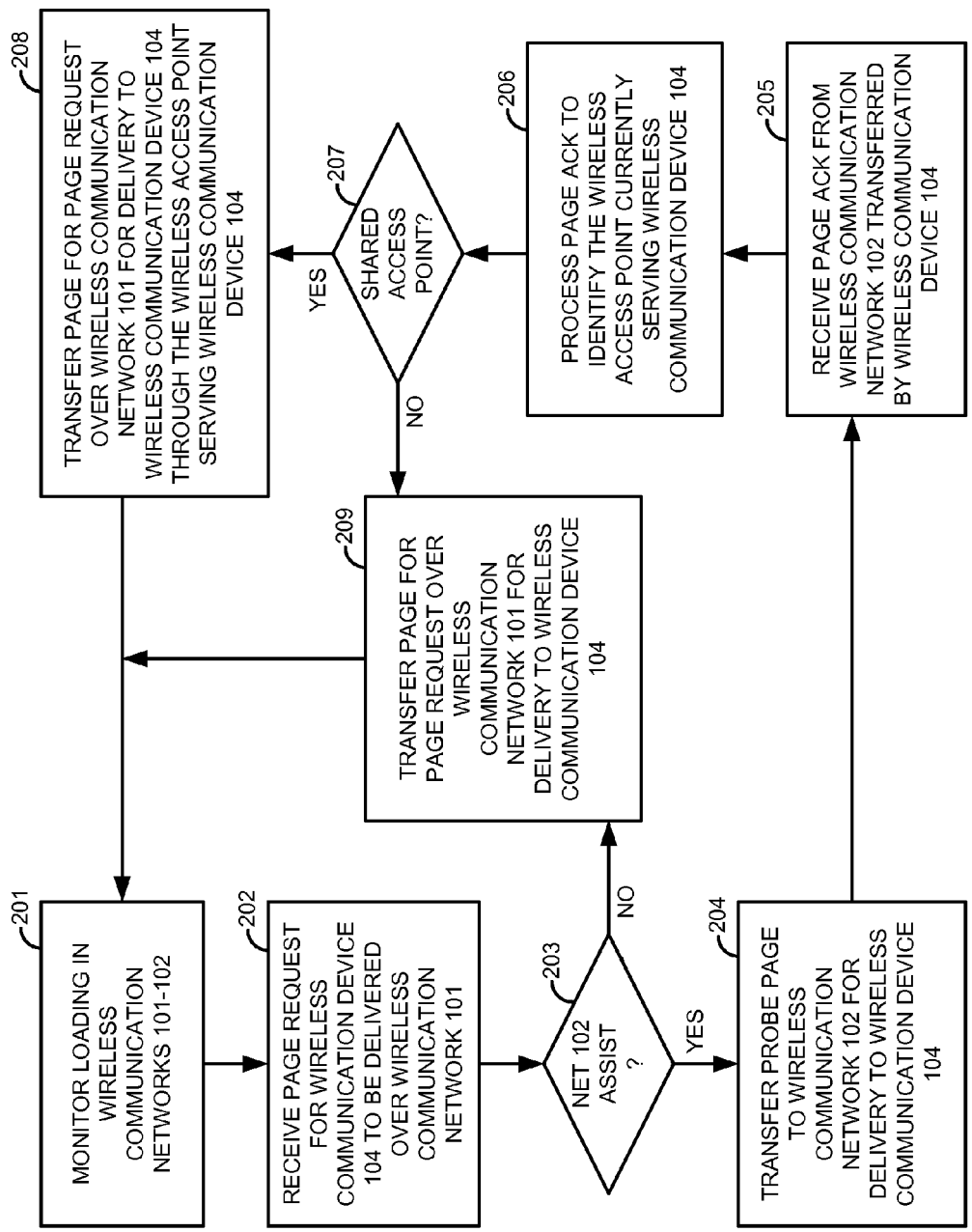
FIG. 2 illustrates the operation of a paging computer system in the multi-network paging system.

FIG. 2 illustrates the operation of paging computer system 103 in multi-network paging system 100. Paging computer system 103 monitors the loading of wireless communication networks 101-102 (201). The loading may be measured in bandwidth, processing capacity, error rates, or some other metric. In some examples, the loading metric is specific to the network control signaling systems in networks 101-102. For example, the loading metric could be control channel occupancy for networks 101-102.

Paging computer system 103 receives page request 150 to deliver a page to wireless communication device 104 over wireless communication network 101 (202). Paging computer system 103 processes the network loading to determine if wireless communication network 102 should be invoked to assist in page delivery (203). Typically, paging computer system 103 compares the loading metrics for networks 101-102 to individual overload thresholds. If the loading of network 101 indicates an overload condition, and the loading of network 102 indicates available capacity, then wireless communication network 102 is invoked to assist wireless communication network 101.

If network 102 assistance is invoked (203), paging computer system 103 transfers a probe page to wireless communication network 102 for delivery to wireless communication device 104 (204). The probe page may be broadcast throughout wireless communication network 102 or throughout a paging zone that corresponds to the applicable paging zone for network 101. Subsequently, paging computer system 103 receives page ACK from wireless communication network 102 that was transferred by wireless communication device 104 (205). Paging computer system 103 processes the ACK to identify the wireless access point that is currently serving wireless communication device 104 (206). If the current wireless access point is shared by wireless communication networks 101-102 (207), then paging computer system 103 transfers a page (based on page request 150) to wireless communication network 101 for delivery to wireless communication device 104 through the shared wireless access point (208).

If the current wireless access point is not shared by wireless communication networks 101-102 (207), or if network 102 assistance is not invoked (203), then paging computer system 103 transfers a page (based on page request 150) to wireless communication network 101 for delivery to wireless communication device 104 in a conventional manner (209). Typically, this entails broadcasting the page through multiple wireless access points in the paging zone which further congests wireless communication network 101.

Figure 3:
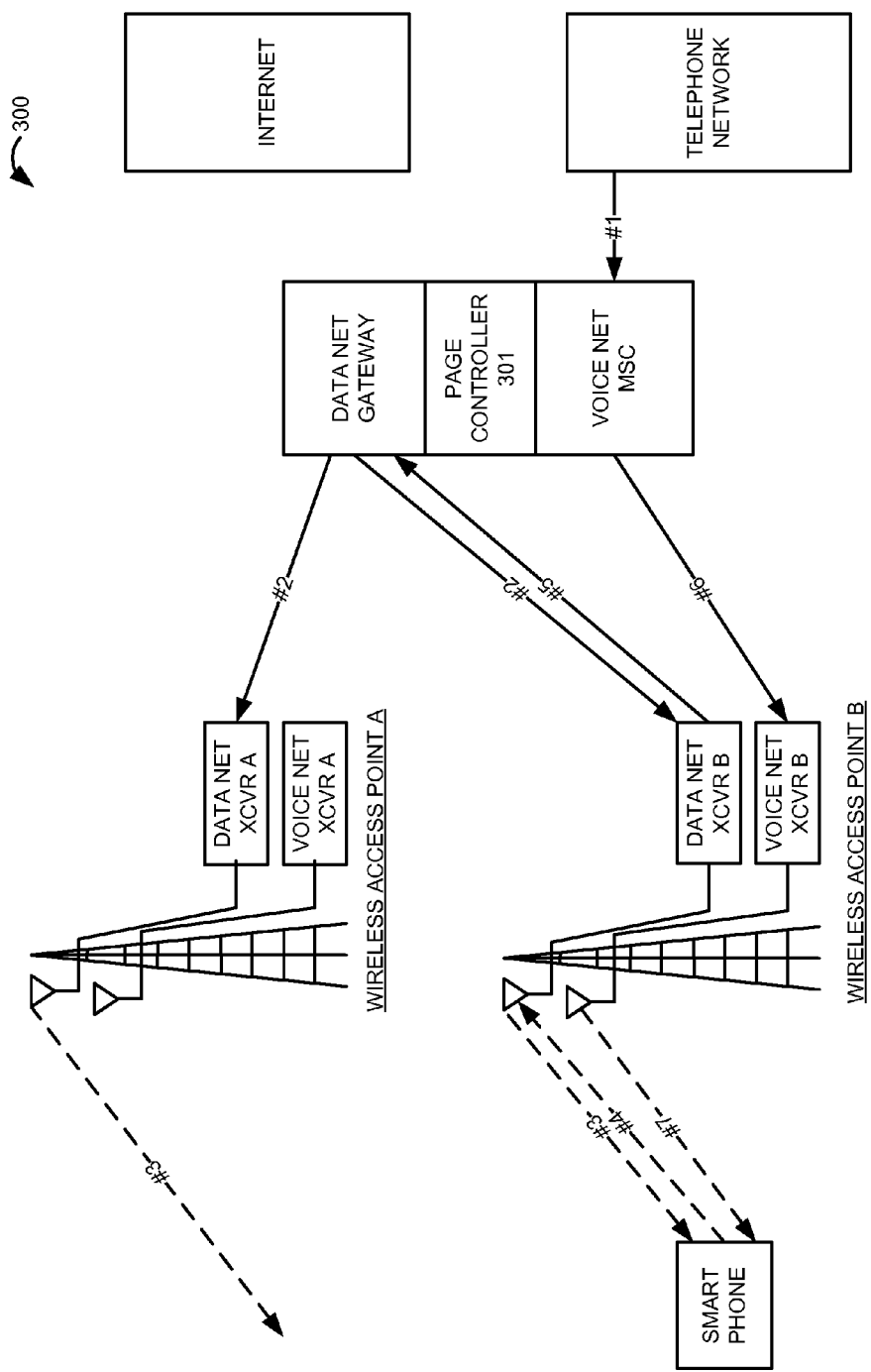
FIG. 3 illustrates a multi-network paging system for a wireless data network and a wireless voice network.

FIG. 3 illustrates multi-network paging system 300 for a wireless data network and a wireless voice network. Although the two wireless networks share wireless access points A and B, the two networks are discrete systems with separate transceivers and antennas at each access point. Thus, the data network and the voice network each have radio frequency circuitry mounted on the same physical structure. The wireless data network provides packet access to the Internet and to other data systems, such as email systems, media servers, and the like. The wireless voice network provides voice calling and text messaging. Although other network types could be used, the wireless voice network could be a Code Division Multiple Access (CDMA) 1x telephony network and the data network could be an Evolution Data-Only (EVDO) Internet access network.

The following operational sequence is depicted by numbered arrows on FIG. 3. The Mobile Switching Center (MSC) in the voice network receives a page request from the telephone network (arrow #1). The page request is a text message for the wireless smartphone to be delivered over the wireless voice network. The MSC forwards the page request to page controller 301. Page controller 301 processes the loading of the wireless data and voice networks to determine that the control channels of the wireless voice network are overloaded, but that the wireless data network has available control channel capacity. In response to the page request and the loading status, page controller 301 instructs the wireless data network to broadcast a probe page to the smartphone (arrows #2 and #3). Thus, the data network gateway transfers the probe page to the data network transceivers at respective wireless access points A and B, and both of the data network antennas at wireless access points A and B wirelessly emit the probe page.

The probe page from wireless access point A is not received by the smartphone, but the probe page from wireless access point B is received by the smartphone. The smartphone acknowledges receipt of the probe page to the wireless data network gateway through wireless access point B (arrows #4 and #5). The wireless data network gateway forwards the ACK to page controller 301.

Page controller 301 processes the ACK to determine that wireless access point B is currently serving the smartphone. Page controller 301 then instructs the voice network MSC to transfer a page (the text message) to the smartphone through wireless access point B. The MSC transfers the page to voice network transceiver B at wireless access point B (arrow #6). The voice network antenna at wireless access point B then wirelessly transfers the page (text message) to the smartphone (arrow #7).

Figure 4:
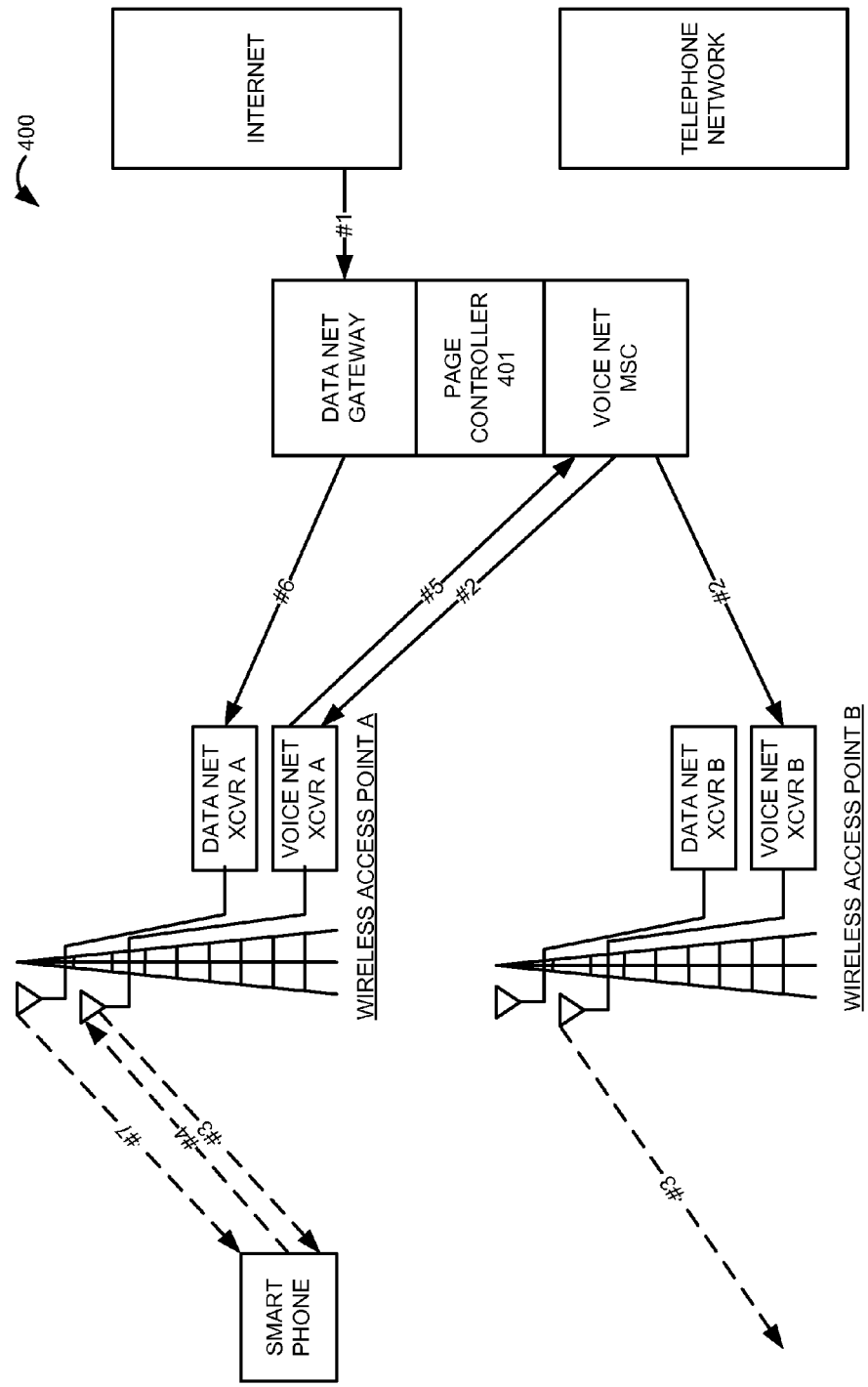
FIG. 4 illustrates a multi-network paging system for a wireless data network and a wireless voice network.

FIG. 4 illustrates multi-network paging system 400 for a wireless data network and a wireless voice network. Although the two wireless networks share wireless access points A and B, the two networks are discrete systems with separate transceivers and antennas at each access point. Thus, the data network and the voice network each have radio frequency circuitry mounted on the same physical structure. The wireless data network provides packet access to the Internet and to other data systems, such as email systems, media servers, and the like. The wireless voice network provides voice calling and text messaging. Although other network types could be used, the wireless voice network could be a Code Division Multiple Access (CDMA) 1x telephony network and the data network could be an Evolution Data-Only (EVDO) Internet access network.

The following operational sequence is depicted by numbered arrows on FIG. 4. The data network gateway in the wireless data network receives a page request from the Internet (arrow #1). The page request is a location request for the wireless smartphone to be delivered over the wireless data network. The gateway forwards the page request to page controller 401. Page controller 401 processes the loading of the wireless data and voice networks to determine that the control channels of the wireless data network are overloaded, but that the wireless voice network has available control channel capacity. In response to the page request and the loading status, page controller 401 instructs the wireless voice network to broadcast a probe page to the smartphone (arrows #2 and #3). Thus, the voice network MSC transfers the probe page to the voice network transceivers at respective wireless access points A and B, and both of the voice network antennas at wireless access points A and B wirelessly emit the probe page.

The probe page from wireless access point B is not received by the smartphone, but the probe page from wireless access point A is received by the smartphone. The smartphone acknowledges receipt of the probe page to the wireless voice network MSC through wireless access point A (arrows #4 and #5). The voice network MSC forwards the ACK to page controller 401.

Page controller 401 processes the ACK to determine that wireless access point A is currently serving the smartphone. Page controller 401 then instructs the data network gateway to transfer a page (the location request) to the smartphone through wireless access point A. The gateway transfers the page to data network transceiver A at wireless access point A (arrow #6). The data network antenna at wireless access point A then wirelessly transfers the page (location request) to the smartphone (arrow #7).

Figure 5:
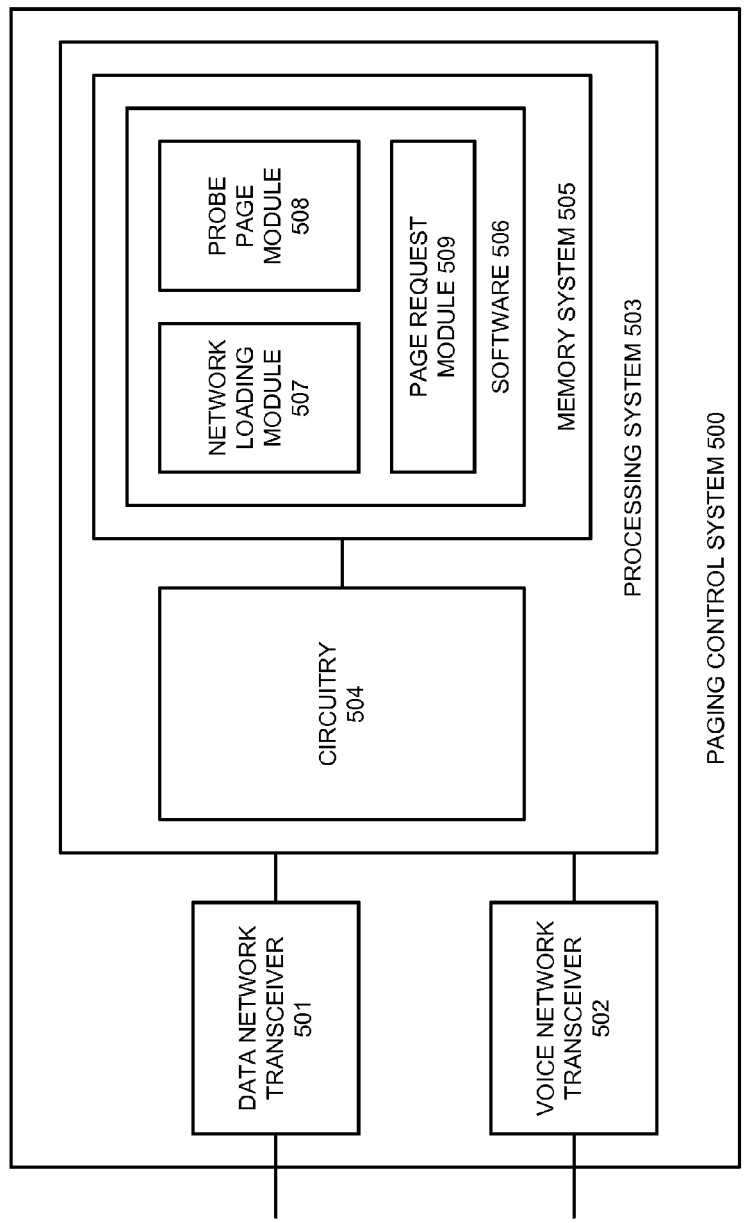
FIG. 5 illustrates a paging control system.

FIG. 5 illustrates paging control system 500. Paging control system 500 provides an example of paging computer system 103, paging controller 301, and paging controller 401, although these systems and controllers may use alternative configurations. Paging control system 500 comprises data network transceiver 501, voice network transceiver 502, and processing system 503. Processing system 503 is linked to network transceivers 501-502. Processing system 503 includes processing circuitry 504 and memory system 505 that stores operating software 506. Operating software 506 comprises software modules 507-509.

Data network transceiver 501 comprises components that communicate over communication links, such as network cards, ports, RF transceivers, processing circuitry and software, or some other communication components. Data network transceiver 501 may be configured to communicate over metallic, wireless, or optical links. Data network transceiver 501 may be configured to use TDM, IP, Ethernet, optical networking, wireless protocols, communication signaling, or some other communication format—including combinations thereof. Data network transceiver 501 is configured to transfer pages and receive page ACKs. Data network transceiver 501 may also receive data network loading information.

Voice network transceiver 501 comprises components that communicate over communication links, such as network cards, ports, Radio Frequency (RF) transceivers, processing circuitry and software, or some other communication components. Voice network transceiver 502 may be configured to communicate over metallic, wireless, or optical links. Voice network transceiver 502 may be configured to use Time Division Multiplex (TDM), Internet Protocol (IP), Ethernet, optical networking, wireless protocols, communication signaling, or some other communication format—including combinations thereof. Voice network transceiver 502 is configured to transfer pages and receive page ACKs. Voice network transceiver 502 may also receive voice network loading information.

Processing circuitry 504 comprises microprocessor and other circuitry that retrieves and executes operating software 506 from memory system 505. Processing circuitry 504 may comprise single device or be distributed across multiple devices—including devices in different geographic areas. Processing circuitry 504 may be embedded in various types of equipment.

Memory system 505 comprises a non-transitory storage medium, such as a disk drive, flash drive, data storage circuitry, or some other memory apparatus. Memory system 505 may comprise single device or be distributed across multiple devices—including devices in different geographic areas. Memory system 505 may be embedded in various types of equipment.

Operating software 506 comprises computer programs, firmware, or some other form of machine-readable processing instructions. Operating software 506 may include an operating system, utilities, drivers, network interfaces, applications, or some other type of software. In this example, operating software 506 also comprises software modules 507-508, although software 506 could have alternative configurations.

When executed by processing circuitry 504, operating software 506 directs processing system 503 to operate as described herein to control multi-network paging. In particular, network loading module 507 monitors network loading and determines when paging assistance by another network should be invoked. Probe page module 508 transfers probe pages, receives probe page ACKs, and identifies the shared wireless access points that are currently serving the paged wireless communication device. Page request module 509 receives page requests, interfaces with modules 507-508 to determine if paging assistance is invoked and to identify the serving wireless access point, and transfers the page for delivery through the identified wireless access point.

Referring back to FIG. 1, wireless communication device 104 comprises Radio Frequency (RF) communication circuitry and an antenna. The RF communication circuitry typically includes an amplifier, filter, modulator, and signal processing circuitry. Wireless communication device 104 may also include a user interface, memory device, software, processing circuitry, or some other communication components. Wireless communication device 101 could be a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 104 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 104 and wireless access points 105-107.

Wireless access points 105-107 comprise geographic sites that include communications equipment and facilities. Wireless access points 105-107 typically include mounting structures, power supplies, and shelters. Wireless access points 105-107 also include network equipment ad described below.

Wireless communication networks 101-102 each comprise RF communication circuitry and antennas located at wireless access points 105-107. Some examples of wireless access points 105-107 include a base transceiver station (BTS), base station controller (BSC), radio base station (RBS), Node B, enhanced Node B (eNode B), and others. The RF communication circuitry typically includes amplifiers, filters, RF modulators, and signal processing circuitry and software. Wireless communication networks 101-102 may also comprise routers, servers, memory devices, software, processing circuitry, cabling, power supplies, network communication interfaces, structural supports. Wireless network protocols that may be utilized by wireless communication networks 101-102 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Paging computer system 103 comprises a processing system and communication transceiver. The processing system includes circuitry, memory, and software. Paging computer system 103 may also include other components such as a router, server, data storage system, and power supply. Paging computer system 103 may reside in a single device or may be distributed across multiple devices. Paging computer system 103 may be a discrete system or may be integrated within other systems—including other systems within system 100.

Wireless communication links 130 use the air or space as the transport medium. Wireless communication links 130 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication links 130 may comprise many different signals sharing the same link. For example, wireless communication links 130 could include multiple signals operating in a single propagation path comprising multiple communication sessions, frequencies, timeslots, transportation ports, logical transportation links, network sockets, IP sockets, packets, or communication directions—including combinations thereof.

Communication links 131-138 use metal, air, space, optical fiber such as glass or plastic, or some other material as the transport medium—including combinations thereof. Communication links 131-138 could use various communication protocols, such as TDM, IP, Ethernet, telephony, optical networking, hybrid fiber coax (HFC), communication signaling, wireless protocols, or some other communication format—including combinations thereof. Communication links 131-138 may be direct links or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of paging a wireless communication device, the method comprising:
    monitoring first loading information for a first wireless communication network and second loading information for a second wireless communication network, wherein the first wireless communication network and the second wireless communication network serve the wireless communication device through a plurality of wireless access points;
    receiving a page request for the wireless communication device that indicates use of the first wireless communication network, determining a page to deliver to the wireless communication device based on the page request, and processing the first loading information and the second loading information to determine if paging assistance from the second wireless communication network is applicable;
    when the paging assistance is applicable, then transferring a probe page over the second wireless communication network for delivery to the wireless communication device to assist in delivery of the page over the first wireless communication network, and receiving a probe page response transferred by the wireless communication device over the second wireless communication network responsive to the probe page;
    processing the probe page response to identify one of the wireless access points serving the wireless communication device which is shared by the first wireless communication network and the second wireless communication network;
    transferring the page to the first wireless communication network for delivery to the wireless communication device through only the identified one of the wireless access points instead of through an entire paging zone associated with the identified one of the wireless access points.

2. The method of claim 1 wherein the first loading information indicates a first status of a first network control signaling system in the first wireless communication network and the second loading information indicates a second status of a second network control signaling system in the second wireless communication network.

3. The method of claim 2 wherein processing the first loading information and the second loading information to determine if the paging assistance from the second wireless communication network is applicable comprises determining if the first status of first network control signaling system exceeds a first loading threshold and if the second status of second network control signaling system falls below a second loading threshold.

4. The method of claim 1 wherein the first loading information indicates first control channel occupancy for the first wireless communication network and the second loading information indicates second control channel occupancy for the second wireless communication network.

5. The method of claim 1 wherein the identified one of the wireless access points comprises first radio frequency circuitry for the first wireless communication network and second radio frequency circuitry for the second wireless communication network, and wherein the first radio frequency circuitry and the second radio frequency circuitry are mounted on the same physical structure.

6. The method of claim 1 wherein the page request comprises an incoming voice call directed to the wireless communication device.

7. The method of claim 1 wherein the page request comprises a text message directed to the wireless communication device.

8. The method of claim 1 wherein the first wireless communication network comprises a wireless voice telephony network and the second wireless communication network comprises a wireless Internet access network.

9. The method of claim 1 wherein the first wireless communication network comprises a code division multiple access 1x network and the second wireless communication network comprises an evolution data only network.

10. The method of claim 1 wherein the first wireless communication network comprises an evolution data only network and the second wireless communication network comprises a code division multiple access 1x network.

11. A communication system to page a wireless communication device, the method comprising:
    a first wireless communication network configured to serve the wireless communication device and generate first loading information;
    a second wireless communication network configured to serve the wireless communication device and generate second loading information, wherein the first wireless communication network and the second wireless communication network share a plurality of wireless access points;
    a paging computer system configured to monitor the first loading information and the second loading information, receive a page request for the wireless communication device that indicates use of the first wireless communication network, determine a page to deliver to the wireless communication device based on the page request, and process the first loading information and the second loading information to determine if paging assistance from the second wireless communication network is applicable;
    when the paging assistance is applicable, then the paging computer system is configured to transfer a probe page over the second wireless communication network for delivery to the wireless communication device to assist in delivery of the page over the first wireless communication network;
    the second wireless communication network is configured to transfer the probe page to the wireless communication device and to receive a probe page response responsive to the probe page from the wireless communication device through one of the shared wireless access points over the second wireless communication network;

the paging computer system is configured to receive and process the probe page response to identify the one shared wireless access point and to transfer the page to the first wireless communication network for delivery to the wireless communication device through only the one shared wireless access point instead of through an entire paging zone associated with the one shared wireless access point; and the first wireless communication network is configured to transfer the page to the wireless communication device through only the one shared wireless access point.

12. The communication system of claim 11 wherein the first loading information indicates a first status of a first network control signaling system in the first wireless communication network and the second loading information indicates a second status of a second network control signaling system in the second wireless communication network.

13. The communication system of claim 12 wherein the paging system is configured to determine if the paging assistance is applicable by determining if the first status of first network control signaling system exceeds a first loading threshold and if the second status of second network control signaling system falls below a second loading threshold.

14. The communication system of claim 11 wherein the first loading information indicates first control channel occupancy for the first wireless communication network and the second loading information indicates second control channel occupancy for the second wireless communication network.

15. The communication system of claim 11 wherein the one of the shared wireless access points comprises first radio frequency circuitry for the first wireless communication network and a second radio frequency circuitry for the second wireless communication network, and wherein the first radio frequency circuitry and the second radio frequency circuitry are mounted on the same physical structure.

16. The communication system of claim 11 wherein the page request comprises an incoming voice call directed to the wireless communication device.

17. The communication system of claim 11 wherein the page request comprises a text message directed to the wireless communication device.

18. The communication system of claim 11 wherein the first wireless communication network comprises a wireless voice telephony network and the second wireless communication network comprises a wireless Internet access network.

19. The communication system of claim 11 wherein the first wireless communication network comprises a code division multiple access 1x network and the second wireless communication network comprises an evolution data only network.

20. The communication system of claim 11 wherein the first wireless communication network comprises an evolution data only network and the second wireless communication network comprises a code division multiple access 1x network.

* * * * *